3,309,370
BICYCLOALKYL PIPERAZINE DERIVATIVES
AND PROCESS
Robert Norman Schut, Edwardsburg, Mich., assignor to Miles Laboratories, Inc., Elkhart, Ind., a corporation of Indiana
No Drawing. Filed July 16, 1964, Ser. No. 383,239
11 Claims. (Cl. 260—268)

This invention relates to bicycloalkanones. In one of its more particular aspects this invention relates to bicycloalkanone derivatives having pharmacological activity.

The compounds of this invention constitute a series of piperazyl substituted bicycloalkanones which can be represented by means of the structural formula:

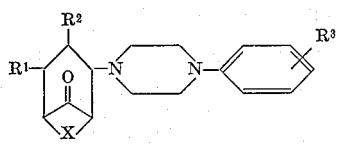

in which $R^1$ is a hydrogen atom or an aryl radical, $R^2$ is a hydrogen atom or an alkyl radical, $R^3$ is a hydrogen atom, a halogen atom, or a haloalkyl radical and X is a polycarbon lower alkylene radical.

The above structural formula shows the compounds of this invention in the form of their free bases. However, these compounds can be provided in the form of any of a number of salts. For example, the compounds can be prepared in the form of their hydrochlorides, hydrobromides, maleates, oxalates and other pharmacologically acceptable salts. In general the free bases can be reacted with any acid, inorganic or organic, which will enter into salt formation with these bases.

The compounds of this invention can be prepared by reacting the appropriate phenyl substituted piperazine enamine of a cycloalkanone with an α,β-unsaturated aldehyde in a suitable solvent such as benzene. No catalyst is ordinarily required. The enamine can be readily prepared by reacting the appropriate cycloalkanone with the desired phenyl substituted piperazine preferably in a suitable solvent such as toluene and in the presence of an acid catalyst such as p-toluenesulfonic acid. The reaction is usually conducted at reflux in order to liberate water. The reactions involved in the preparation of the novel bicycloalkanones of this invention can be illustrated by means of the following reaction sequence in which the various substituents are as above defined.

(I)

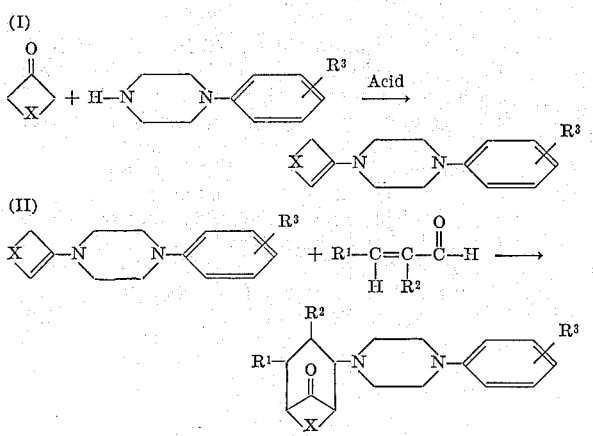

The reaction of phenyl substituted piperazine enamines with α,β-unsaturated aldehydes and aromatic ketones leads to novel aminopyran derivatives of the general formula:

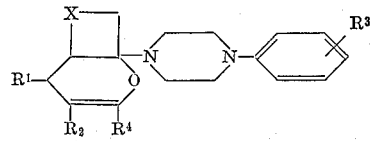

wherein $R^1$, $R^2$, $R^3$ and X are as above defined and $R^4$ is a hydrogen atom or an aryl radical.

Where $R^4$ is a hydrogen atom, that is, where the unsaturated carbonyl compound is a α,β-unsaturated aldehyde, heating the aminopyran derivative in a mixture of triethylamine and dimethylformamide results in rearrangement to the corresponding bicycloalkanone as shown in the following reaction sequence:

(III)
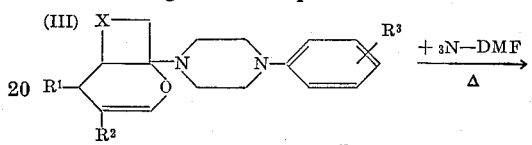

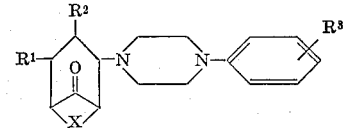

Where $R^4$ is an aryl radical, for example phenyl, the aminopyran derivative undergoes a retrocondensation in the presence of a polar solvent to produce an alkylated enamine derivative but does not undergo an internal Mannich reaction to produce the bicycloalkanone. Thus, in the case where $R^4$ is aryl the aminopyran derivative reacts as follows:

(IV)
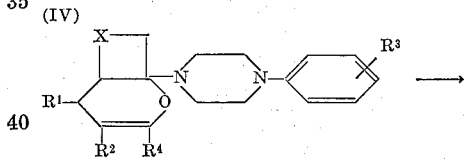

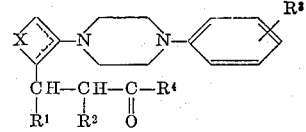

wherein the dotted lines signify that the position of the double bond is not known with certainty.

This novel open-chain ketone is a useful chemical intermediate.

The novel bicycloalkanones of this invention have been shown to have activity as anti-inflammatory and analgetic agents.

This invention will be better understood by reference to the following examples which are included for the purpose of illustration and are not to be considered as limiting the scope of this invention which is defined in the claims appended hereto. All temperatures given are in degrees centigrade unless otherwise noted.

EXAMPLE I 2-(4-PHENYL-1-PIPERAZYL)-9-OXOBICYCLO
[3.3.1]NONANE

A. *1-(4-phenyl-1-piperazyl)cyclohexene*

A solution of 162 g. (1.0 mole) of 1-phenylpiperazine. 98 g. (1.0 mole) of cyclohexanone and 1 g. of p-toluene sulfonic acid in 300 ml. of toluene was heated under reflux for 1 day. The water liberated was collected in a Dean-Stark trap. The solvent was distilled and the residue was distilled in vacuo, B.P. 125°–140° (0.2 mm.) and recrystallized from 2-propanol, M.P. 112°–114°, yield 84%.

*Analysis.*—Calcd. for C$_{16}$H$_{22}$N$_2$: N (basic), 5.79. Found: N (basic), 5.92.

B. 8a-(4-phenyl-1-piperazyl)-4a,5,6,7,8,8a-hexahydro-4H-1-benzopyran

To a stirred solution of 14.1 g. (0.0583 mole) of 1-(4-phenyl-1-piperazyl)cyclohexene in 50 ml. of dry benzene was added a solution of 4.5 g. (0.080 mole) of acrolein (dried over MgSO$_4$) in 25 ml. of dry benzene over a 30 minute period (5°–10°). The solution was stirred at this temperature for 1 hour, allowed to stand at room temperature for 5 hours, then stored overnight in the refrigerator. Some white crystals had formed by morning. These were collected, washed with a small amount of benzene ether, then dried (4.6 g.), M.P. 117°–118°;

$\nu_{max.}^{CHCl_3}$ 1660(—O—C=C—), 1235, 1150 and 1070 cm.$^{-1}$ (ether)

The n.m.r. spectrum (CDCl$_3$) showed resonance peaks due to the 2 and 3 protons at 3.87 T (doublet) and 5.41 T (multiplet) respectively.

*Analysis.*—Calcd. for C$_{19}$H$_{26}$N$_2$O: C, 76.51; H, 8.72; N (total), 9.40; N (basic), 4.70. Found: C, 76.34; H, 8.66; N (total), 9.49; N (basic), 4.69. The benzene-ether filtrate from above was concentrated in vacuo to give a white solid. This material was broken up, stirred with Skelly A (n-pentane), collected and recrystallized from benzene-Skelly B (n-hexane) to give 7.6 g. of white crystals, M.P. 113°–114°, undepressed when mixed with an analytical sample of the aminopyran. The total yield was 12.2 g. (71%).

C. 2-(4-phenyl-1-piperazyl)-9-oxobicyclo[3.3.1]nonane

To a solution of 9.03 g. of aminopyran in 100 ml. of freshly distilled dimethylformamide was added 3.1 g. of triethylamine. The solution was heated in a nitrogen atmosphere for 12 hours at 70°–75°. The solvents were removed by distillation in vacuo and the residue was stirred with Skelly B. The crude solid weighed 7.61 g., M.P. 100°–105°;

$\nu_{max.}^{CHCl_3}$ 1715 cm.$^{-1}$

Recrystallization from Skelly B and a few drops of benzene followed by recrystallization from a small quantity of methanol produced the analytical sample, M.P. 129°–131°.

*Analysis.*—Calcd. for C$_{19}$H$_{26}$N$_2$O: C, 76.51; H, 8.72; N, 9.40. Found: C, 76.26; H, 8.45; N, 9.61.

D. 2-(4-phenyl-1-piperazyl)-9-oxobicyclo[3.3.1]nonane hydrochloride

A 10.0 g. sample of the free base was suspended in 2-propanol and treated with a slight excess of 1 mole-equivalent of 3.4 N HCl-i-PrOH. The mixture was heated and the salt dissolved by addition of the minimal amount of water. Analytically pure monohydrochloride was isolated (6.0 g.), M.P. 184°–185°.

*Analysis.*—Calcd. for C$_{19}$H$_{26}$N$_2$O·HCl: Cl, 10.59; N, 8.38. Found: Cl, 10.47; N, 8.26.

EXAMPLE II 2-(4-PHENYL-1-PIPERAZYL)-3-METHYL-9-OXOBICYCLO [3.3.1]NONANE

A. 8a-(4-phenyl-1-piperazyl)-3-methyl-4a,5,6,7,8,8a-hexahydro-4H-1-benzopyran To a solution of 48.4 g. (0.20 mole) of 1-(4-phenyl-1-piperazyl) cyclohexene dissolved in a minimal amount of dry benzene was added a solution of 17.5 g. (0.25 mole) of methacrolein in 25 ml. of benzene. After being stored in the refrigerator for 5 days, the crystalline product was collected and washed with Skelly-benzene, yield 27.0 g. (43%) M.P. 121°–123°. A sample was recrystallized from Skelly A-benzene (n-pentane-benzene) in the form of fluffy crystals, M.P. 126°–127°, $\nu_{max.}^{CHCl_3}$ 1680 (m.), 1210, 1165 and 1130 (s.) cm.$^{-1}$

*Analysis.*—Calcd. for C$_{20}$H$_{28}$N$_2$O: C, 76.92; H, 8.97; N, 8.97. Found: C, 76.47; H, 8.84; N, 9.08.

B. 2-(4-phenyl-1-piperazyl)-3-methyl-9-oxobicyclo[3.3.1]nonane (1) *Isolation from bicyclic aminoketone-aminopyran mixture.*—In a typical 0.36 mole run, there was obtained 32.2 g. of aminopyran. The filtrate on dilution with Skelly A produced 25.0 g. of crude solid (bicyclic aminoketone). This material was dissolved in dilute hydrochloric acid and shaken with ether in order to remove neutral material. The aqueous layer was basified and extracted with chloroform. The dried extract was concentrated in vacuo and the residue was purified by warming in methanol, yield 6.38 g., M.P. 144°–145°. The analytical sample was prepared by recrystallization from Skelly A-benzene, M.P. 145°–146°;

$\nu_{max.}^{CHCl_3}$ 1705 cm.$^{-1}$

*Analysis.*—Calcd. for C$_{20}$H$_{28}$N$_2$O: C, 76.92; H, 8.97; N, 8.97. Found: C, 76.37; H, 8.82; N, 9.28.

(2) *Isomerization of aminopyran (A) to bicyclic aminoketone (B).*—A solution of 14.0 g. of the aminopyran in 200 ml. of purified dimethylformamide and 25 ml. of triethylamine was heated under a nitrogen atmosphere at 85°–90° for 2 days. The solvents were concentrated in vacuo and the residue dissolved in dilute hydrochloric acid. The free base was isolated as described above for the aminopyran, yield 1.2 g. (9%), M.P. 144°–146°.

C. 2-(4-phenyl-1-piperazyl)-3-methyl-9-oxobicyclo[3.3.1]nonane hydrobromide

A 9.30 g. sample of the free base was dissolved in 125 ml. of ethyl acetate and treated with 9.58 ml. of 3.11 N—HBr—i—PrOH. The precipitated salt was collected, washed with ethyl acetate and dried, yield 8.4 g. Recrystallization from i—PrOH—H$_2$O gave 4.70 g. of product, M.P. 179°–180° (dec.), $\nu_{max.}^{KCl}$ 1715 cm.$^{-1}$

*Analysis.*—Calcd. for C$_{20}$H$_{28}$N$_2$O·HBr: Br, 20.33; N, 7.12. Found: Br, 20.72; N, 7.23.

EXAMPLE III 2-(4-PHENYL-1-PIPERAZYL)-7-CYCLOHEXYL-9-OXOBICYCLO[3.3.1]NONANE

A. 1-(4-phenyl-1-piperazyl)-4-cyclohexylcyclohexene

This enamine was prepared according to the procedure of Example IA using 4-cyclohexylcyclohexanone as the cycloalkanone. The product was isolated in a yield of 80%, M.P. 177°–179°.

*Analysis.*—Calcd. for C$_{22}$H$_{31}$N$_2$: N, 8.67. Found: N, 8.73.

B. 8a-(4-phenyl-1-piperazyl)-6-cyclohexyl-4a,5,6,7,8,8a-hexahydro-4H 1-benzopyran To a stirred suspension of 64.8 g. (0.20 mole) of 1-(4-phenyl-1-piperazyl)-4-cyclohexylcyclohexene in 150 ml. of dry benzene and 150 ml. of dimethylformamide at 10° was added a solution of 13 g. of acrolein in 50 ml. of benzene. The mixture was swirled on the steam bath until all the solid material had dissolved. The solution was stirred for 30 minutes, allowed to stand at room temperature for 3 hours, then stored in the refrigerator overnight. The solid which had precipitated was collected and washed with Skelly A, yield 36.5 g., M.P. 108°–110° (cloudy melt). Concentration of the filtrate and stirring with Skelly A produced an additional 17.2 g. of product, M.P. 102°–106°, total yield 53.7 g. (71%). The analytical sample was prepared by recrystallization from benzene-Skelly B, M.P. 107°–109°;

$\nu_{max.}^{CHCl}$ 1660 (m.) cm.$^{-1}$

*Analysis.*—Calcd. for C$_{25}$H$_{36}$N$_2$O: C, 78.95; H, 9.47; N, 7.37. Found: C, 78.58; H, 9.36; N, 7.47.

C. 2-(4-phenyl-1-piperazyl)-7-cyclohexyl-9-oxobicyclo [3.3.1]-nonane

A solution of 53.7 g. (0.14 mole) of aminopyran in 600 ml. of dimethylformamide and 60 ml. of triethylamine was heated at 75°–80° for 40 hours under a nitrogen atmosphere. Concentration in vacuo gave an orange-colored sirup. Stirring in Skelly A gave a greasy solid which was dissolved in benzene. Addition of excess dilute hydrochloric acid resulted in the formation of a crude hydrochloride. The acid filtrate was made basic and extracted with chloroform. Drying and concentration in vacuo gave an oil from which it was possible to obtain 2.0 g. of solid material by chilling in methanol; M.P. 135°–138°;

$$\nu_{max.}^{CHCl_3}\ 1710\ cm.^{-1}$$

The crude hydrochloride mentioned above was also converted to the free base, yield 13.3 g., M.P. 124°–125°, $$\nu_{max.}^{CHCl_3}\ 1710\ cm.^{-1}$$

A mixed M.P. with product of M.P. 135°–138° caused no depression. The total yield was 15.3 g. (29%). An analytical sample was obtained by recrystallization of the lower melting material from ethanol, M.P. 128°–129°.

*Analysis.*—Calcd. for $C_{25}H_{36}N_2O$: C, 78.95; H, 9.47; N, 7.37. Found: C, 78.69; H, 9.47; N, 7.47.

D. 2-(4-phenyl-1-piperazyl)-7-cyclohexyl-9-oxobicyclo [3.3.1]-nonane hydrochloride A 5.61 g. sample of the free base dissolved in warm 2-propanol-ether was treated with 5.22 ml. of 2.84 N—HCl—i—PrOH. On cooling a crystalline white salt formed, yield 4.6 g. Recrystallization from isopropyl alcohol gave 2.50 g. of purified product, M.P. 175°–176° (dec.), $$\nu_{max.}^{KCl}\ 1720\ cm.^{-1}$$

*Analysis.*—Calcd. for $C_{25}H_{36}N_2O \cdot HCl$: Cl, 8.51; N, 6.71. Found: Cl, 8.44; N, 6.71.

EXAMPLE IV

A. 1-(4-phenyl-1-piperazyl)cyclopentene

This enamine was prepared according to the procedure of Example IA using cyclopentanone as the cycloalkanone. The product was isolated in a yield of 61%, M.P. 101°.

*Analysis.*—Calcd. for $C_{15}H_{20}N_2$: N, 12.27. Found: N, 12.40.

B. 2-(4-phenyl-1-piperazyl)-8-oxobicyclo[3.2.1]octane

Acrolein (ca. 0.25 mole) was added to a stirred solution of 1-(4-phenyl-1-piperazyl)cyclopentene in dry benzene. The temperature was maintained below 20° by means of an ice-bath. After standing in the refrigerator overnight, the solvent was distilled in vacuo. The light sirup was stirred in Skelly A to gradually give a greasy solid. Stirring this material with warm ether produced a light tan solid, yield 20.7 g. (37%), M.P. 128°–131°;

$$\nu_{max.}^{CHCl_3}\ 1740\ cm.^{-1}$$

For further purification, the product was dissolved in dilute hydrochloric acid and the solution shaken with ether to remove neutral material. Regeneration of the free base and recrystallization from methanol give the bicyclic aminoketone as fine needles, M.P. 137°–138°.

*Analysis.*—Calcd. for $C_{18}H_{24}N_2O$: C, 76.06; H, 8.45; N, 9.86. Found: C, 75.88; H, 8.78; N, 10.07.

C. 2-(4-phenyl-1-piperazyl)-8-oxobicyclo[3.2.1]octane hydrochloride hydrate

A 23.6 g. sample (0.0831 mole) of the free base in 100 ml. of isopropyl alcohol and 250 ml. of warm ethyl acetate was treated with 29.3 ml. of 2.84 N HCl—i—PrOH (1 mole-equiv.). The precipitated salt was recrystallized from aqueous isopropyl alcohol, yield 14.5 g., M.P. 196°–197° (dec.) with droplets of moisture appearing in the top portion of the tube during the measurement. The analysis indicated a hydrate and the infrared spectrum (KCl) showed only a very weak band in the 1750 cm.$^{-1}$ region in agreement with carbonyl hydration.

*Analysis.*—Calcd. for $C_{18}H_{24}N_2O \cdot HCl \cdot H_2O$: Cl, 10.47; N, 8.26. Found: Cl, 10.42; N, 8.45.

D. 2-(4-phenyl-1-piperazyl)-8-oxobicyclo[3.2.1]octane hydrochloride

A sample of the hydrate was heated for 10 hours in the Abderhalden pistol at 110°–112° (in vacuo). The anhydrous product had M.P. 196°–197° (dec.). The infrared spectrum (KCl) now showed a strong band at 1755 cm.$^{-1}$.

*Analysis.*—Calcd. for $C_{18}H_{24}N_2O \cdot HCl$: Cl, 11.05; N, 8.72. Found: Cl, 11.01; N, 8.92.

EXAMPLE V

A. 1-(4-phenyl-1-piperazyl)cycloheptene

This enamine was prepared according to the procedure of Example IA using cycloheptanone as the cycloalkanone. The product was isolated in a yield of 27%, M.P. 59°–61°.

*Analysis.*—Calcd. for $C_{17}H_{24}N_2$: N, 10.92. Found: N, 11.09.

B. 2-(4-phenyl-1-piperazyl)-10-oxobicyclo[3.4.1]decane

To a stirred solution of 51.2 g. (0.20 mole) of 1-(4-phenyl-1-piperazyl)cycloheptene in 100 ml. of dry benzene was added 13 g. (0.23 mole) of acrolein at 10°–15°. After the reaction solution had been allowed to stand in the refrigerator overnight, the solvent was distilled and the residue distilled in vacuo. A fraction of B.P. 200°–210° (0.5 mm.) was collected (18 g.). Stirring with Skelly A produced a solid which was recrystallized from benzene-Skelly A to give 6.3 g. of bicyclic aminoketone, M.P. 133°–135°.

*Analysis.*—Calcd. for $C_{20}H_{28}N_2O$: N, 8.97. Found: N, 9.21.

C. 2-(4-phenyl-1-piperazyl)-10-oxobicyclo[3.4.1]decane hydrobromide

To the free base (6.0 g.) in methanol was added excess hydrogen bromide in 2-propanol. The salt was dissolved by the addition of just the required amount of water to the boiling alcohol suspension. The white crystals which formed amounted to 4.2 g., M.P. 226°–227°.

*Analysis.* — Calcd. for $C_{20}H_{28}N_2O \cdot HBr$; Br, 20.32. Found: Br, 20.48.

EXAMPLE VI

A. 2-(4-phenyl-1-piperazyl)-4-phenyl-9-oxobicyclo [3.3.1]-nonane

The free base was prepared in benzene solution starting with 1-(4-phenyl-1-piperazyl)cyclohexene and cinnamaldehyde. After removal of solvent the residue was stirred with Skelly A to give a solid. Recrystallization from benzene-Skelly A gave the bicyclic aminoketone in 36% yield, M.P. 167°–168°;

$$\nu_{max.}^{CHCl_3}\ 1710\ cm.^{-1}$$

*Analysis.* — Calcd. for $C_{25}H_{30}N_2O$: N (basic), 3.74. Found: N (basic), 3.72.

B. 2-(4-phenyl-1-piperazyl)-4-phenyl-9-oxobicyclo [3.3.1]-nonane hydrochloride The salt was prepared in the usual manner from hydrogen chloride-isopropyl alcohol; M.P. 229°–230°.

*Analysis.* — Calcd. for $C_{25}H_{30}N_2O \cdot HCl$: Cl, 8.65. Found: Cl, 8.48.

EXAMPLE VII

2-(4-m-CHLOROPHENYL-1-PIPERAZYL)-9-OXOBI-CYCLO[3.3.1]NONANE

A. 1-(4-m-chlorophenyl-1-piperazyl)cyclohexene

This enamine was prepared according to the procedure of Example IA using 1-m-chlorophenylpiperazine as the piperazine derivative. The product was isolated in a yield of 100%, B.P. 160°–170 (0.15 mm.).

Analysis.—Calcd. for $C_{16}H_{21}ClN_2$: N (basic), 5.06. Found: N (basic), 5.01.

B. 8a-(4-m-chlorophenyl-1-piperazyl)-4a,5,6,7,8a-hexahydro-4H-1-benzopyran

This intermediate was prepared according to the procedure described for the previously mentioned aminopyrans using 1-(4-m-chlorophenyl-1-piperazyl)cyclohexene and acrolein. The material was isolated as an ivory colored solid in 85% yield, M.P. 88°–92°. Recrystallization from ether-isopropyl alcohol gave purified product, M.P. 94.5°–96°;

$\nu_{max.}^{CHCl_3}$ 1660 cm.$^{-1}$

Analysis.—Calcd. for $C_{19}H_{25}ClN_2O$: N (basic), 4.21. Found: N (basic), 4.26.

C. 2-(4-m-chlorophenyl-1-piperazyl)-9-oxobicyclo[3.3.1]nonane

A 25.9 g. sample of the aminopyran in 500 ml. of distilled dimethylformamide and 50 ml. of triethylamine was heater under a nitrogen atmosphere at 80°–90° for 1 day. The solvents were removed in vacuo and the residue treated with dilute hydrochloric acid. The neutral material was removed by extraction with ether and the free base was regenerated. A chloroform extract yielded 21.2 g. of basic sirupy material. This crude product crystallized when stirred with cold methanol, yield 11.0 g., M.P. 88°–91°. Recrystallization from methanol containing a small amount of ether gave crystals of M.P. 94°–96°;

$\nu_{max.}^{CHCl_3}$ 1710 cm.$^{-1}$ (6.6 g.)

Analysis.—Calcd. for $C_{19}H_{25}ClN_2O$: N (basic), 4.21. Found: N (basic), 4.27.

D. 2-(4-m-chlorophenyl-1-piperazyl)-9-oxobicyclo[3.3.1]nonane hydrochloride The hydrochloride was prepared in HCl—i—PrOH from 6.17 g. of the free base (M.P. 94°–96°); yield of salt, 6.25 g., M.P. 193°–194° (dec.). Recrystallization from aqueous isopropyl alcohol gave 2.65 g. of analytically pure product, M.P. 195°–196° (dec.).

Analysis.—Calcd. for $C_{19}H_{25}ClN_2O \cdot CHl$: Cl, 9.59; N, 7.75. Found: Cl, 9.53; N, 7.48.

EXAMPLE VIII

A. 2,4-diphenyl-8a-(4-phenyl-1-piperazyl)-4a,5,6,7,8,8a-hexahydro-4H-1-benzopyran A solution of 52.0 g. (0.25 mole) of chalcone in benzene was added to a stirred solution of 60.5 g. (0.25 mole) of 1-(4-phenyl-1-piperazyl)-cyclohexene in benzene. After standing for 3 days, the benzene was removed in vacuo and the residual sirup was stirred with Skelly A. The solid material which formed was collected and washed with Skelly A, yield 48.5 g. (44%), M.P. 115°–117°, $\nu_{max.}^{CHCl_3}$ 1660 cm.$^{-1}$ (medium)

Two crystallizations from benzene-Skelly A gave the analytical sample, M.P. 129.5°–130.5°.

Analysis.—Calcd. for $C_{31}H_{34}N_2O$: C, 82.66; H, 7.56; N, 6.22. Found: C, 82.47; H, 7.34; N, 6.23.

B. 1-(4-phenyl-1-piperazyl)-2(6)-(1-phenyl-2-benzoylethyl)-cyclohexene

In a 0.27 mole run carried out as described above the residual sirup obtained on concentration of the reaction solution was crystallized from methanol instead of Skelly A, yield 60%, M.P. 135°–136°, $\nu_{max.}^{CHCl_3}$ 1685, 1645 (w.) cm.$^{-1}$ The analytical sample was prepared by recrystallization from ethanol, M.P. 134°–135°.

Analysis.—Calcd. for $C_{31}H_{34}N_2O$: C, 82.66; H, 7.56; N, 6.22. Found: C, 82.10; H, 7.42; N, 6.25.

This compound could also be prepared by recrystallization of 2,4-diphenyl-8a-(4-phenyl-1-piperazyl)-4a,5,6,7,8,8a-hexahydro-4H-1-benzopyran from ethanol. Thus, a 3.00 g. sample of the product from part A was dissolved in absolute ethanol and heated under reflux for 5 minutes. The crystalline product obtained (2.19 g.) had M.P. 132°–133°; mixed M.P. with aminopyran from A was depressed 124°–126°, mixed M.P. with enamine ketone from B not depressed.

EXAMPLE IX

2-phenyl-8a-(4-phenyl-1-piperazyl)-4a,5,6,7,8,8a-hexahydro-4H-1-benzopyran

The reaction was carried out according to the procedure of Example VIIIA using 0.05 mole quantities of acrylophenone and 1-(4-phenyl-1-piperazyl)cyclohexene. The yield of crude product was 75%, M.P. 87°–91°. Recrystallization from Skelly A-benzene and a further recrystallization from Skelly B gave the analytical sample, M.P. 96°–97°;

$\nu_{max.}^{CHCl_3}$ 1660 cm.$^{-1}$

Analysis.—Calcd. for $C_{25}H_{30}N_2O$: N, 7.49. Found: N, 7.40.

EXAMPLE X

A. 1-(m-trifluoromethylphenyl)-4-(1-cyclohexenyl)piperazine

This enamine was prepared according to the procedure of Example IA using 1-m-trifluoromethylphenylpiperazine as the piperazine derivative. The product was isolated in a yield of 69%, B.P. 154°–169° (0.15 mm.).

Analysis.—Calcd. for $C_{17}H_{21}F_3N_2$: N (basic), 4.51. Found: N (basic), 4.53.

B. 2-(4-m-trifluoromethylphenyl-1-piperazyl)-9-oxobicyclo-[3.3.1]nonane

To a stirred solution of 46.5 g. (0.145 mole) of 1-(m-trifluoromethylphenyl)-4-(1 - cyclohexenyl)piperazine in 250 ml. of dry benzene was added 11.4 g. (0.20 mole) of acrolein in 25 ml. of dry benzene. The solution was stirred at 10°–15° for 30 minutes and then allowed to stand at room temperature 1 hour. After storing 12 hours in the refrigerator, the solvent was removed in vacuo and the residue dissolved in 500 ml. of dimethylformamide and 50 ml. of triethylamine. The solution was heated in a nitrogen atmosphere for 16 hours at 85°–90°. The solvent was removed and the residue dissolved in ether. The solution was shaken with dilute hydrochloric acid. The aqueous layer was separated, made alkaline with sodium hydroxide solution, and extracted with chloroform. The extract was dried and concentrated in vacuo. Distillation of the residue gave 21 g. of material, B.P. 200°–210° (0.25 mm.). Crystallization from Skelly B gave 6.5 g. of low melting solid.

Analysis.—Calcd. for $C_{20}H_{25}F_3N_2$: N (basic), 3.82. Found: N (basic), 3.84.

C. 2-(4-m-trifluoromethylphenyl-1-piperazyl)-9-oxobicyclo-[3.3.1]nonane hydrochloride A solution of HCl in 2-propanol (1 mole-equiv.) was added to 6.0 g. of the free base. The salt was collected and dried, yield 4.0 g., M.P. 209°–210°.

Analysis.—Calcd. for $C_{20}H_{25}F_3N_2 \cdot HCl$: Cl, 8.80; N, 6.96. Found: Cl, 8.75; N, 7.00.

The various compounds described in the above examples are shown in Table I with their physical and chemical characteristics.

TABLE I

| Example No. | Chemical Name and Structure | Formula | Melting Point, °C. | Boiling Point, °C. (press.) | Analysis Calculated C | H | N | Cl | Analysis Found C | H | N | Cl |
|---|---|---|---|---|---|---|---|---|---|---|---|---|
| I-A | 1-(4-phenyl-1-piperazyl)cyclohexene | $C_{16}H_{22}N_2$ | 112–114 | 125–140 (0.2 mm.) | | | 5.79 (basic) | | | | 5.92 (basic) | |
| I-B | 8a-(4-phenyl-1-piperazyl)-4a,5,6,7,8,8a-hexahydro-4H-1-benzopyran | $C_{19}H_{28}N_2O$ | 113–114 | | 76.51 | 8.72 | 9.40 (total) 4.70 (basic) | | 76.34 | 8.66 | 9.49 (total) 4.69 (basic) | |
| I-C | 2-(4-phenyl-1-piperazyl)-9-oxobicyclo[3.3.1]nonane | $C_{19}H_{28}N_2O$ | 129–131 | | 76.51 | 8.72 | 9.40 | | 76.26 | 8.45 | 9.61 | |
| I-D | 2-(4-phenyl-1-piperazyl)-9-oxobicyclo[3.3.1]nonane hydrochloride | $C_{19}H_{28}N_2O \cdot HCl$ | 184–185 | | | | 8.38 | 10.59 | | | 8.26 | 10.47 |
| II-A | 8a-(4-phenyl-1-piperazyl)-3-methyl-4a,5,6,7,8,8a-hexahydro-4H-1-benzopyran | $C_{20}H_{28}N_2O$ | 126–127 | | 76.92 | 8.97 | 8.97 | | 76.47 | 8.84 | 9.08 | |

TABLE I—Continued

| Example No. | Chemical Name and Structure | Formula | Melting Point, °C. | Boiling Point, °C. (press.) | Analysis ||||||||
|---|---|---|---|---|---|---|---|---|---|---|---|---|
| | | | | | Calculated |||| Found ||||
| | | | | | C | H | N | Cl | C | H | N | Cl |
| II-B | 2-(4-phenyl-1-piperazyl)-3-methyl-9-oxobicyclo[3.3.1]-nonane. | C₂₀H₂₈N₂O | 145–146 | | 76.92 | 8.97 | 8.97 | | 76.37 | 8.82 | 9.28 | |
| II-C | 2-(4-phenyl-1-piperazyl)-3-methyl-9-oxobicyclo[3.3.1]-nonane hydrobromide. | C₂₀H₂₈N₂O·HBr | 179–180 | | | | 7.12 | 20.33 (Br) | | | 7.23 | 20.72 (Br) |
| III-A | 1-(4-phenyl-1-piperazyl)-4-cyclohexylcyclohexene. | C₂₂H₃₄N₂ | 177–179 | | | | 8.67 | | | | 8.73 | |
| III-B | 8a-(4-phenyl-1-piperazyl)-6-cyclohexyl-4a,5,6,7,8,8a-hexahydro-4H-1-benzopyran. | C₂₅H₃₈N₂O | 107–109 | | 78.95 | 9.47 | 7.37 | | 78.58 | 9.36 | 7.47 | |

TABLE I—Continued

| Example No. | Chemical Name and Structure | Formula | Melting Point, °C. | Boiling Point, °C. (press.) | Analysis |||||||||
|---|---|---|---|---|---|---|---|---|---|---|---|---|---|
| | | | | | Calculated |||| Found ||||
| | | | | | C | H | N | Cl | C | H | N | Cl |
| III-C | 2-(4-phenyl-1-piperazyl)-7-cyclohexyl-9-oxobicyclo(3.3.1]-nonane. | C₂₅H₃₆N₂O | 128-129 | | 78.95 | 9.47 | 7.37 | | 78.69 | 9.47 | 7.47 | |
| III-D | 2-(4-phenyl-1-piperazyl)-7-cyclohexyl-9-oxobicyclo[3.3.1]-nonane hydrochloride. | C₂₅H₃₆N₂O·HCl | 175-176 | | | | 6.71 | 8.51 | | | 6.71 | 8.44 |
| IV-A | 1-(4-phenyl-1-piperazyl)cyclopentene | C₁₅H₂₀N₂O | 101 | | | | 12.27 | | | | 12.40 | |
| IV-B | 2-(4-phenyl-1-piperazyl)-8-oxobicyclo[3.2.1]octane | C₁₈H₂₄N₂O | 137-138 | | 76.06 | 8.45 | 9.86 | | 75.88 | 8.78 | 10.07 | |

TABLE I—Continued

| Example No. | Chemical Name and Structure | Formula | Melting Point, °C. | Boiling Point, °C. (press.) | Analysis | | | | | | | |
|---|---|---|---|---|---|---|---|---|---|---|---|---|
| | | | | | Calculated | | | | Found | | | |
| | | | | | C | H | N | Cl | C | H | N | Cl |
| IV-C | 2-(4-phenyl-1-piperazyl)-8-oxobicyclo[3.2.1]octane hydrochloride hydrate. | C₁₈H₂₄N₂O·HCl·H₂O | 196–197 | | | | 8.20 | 10.47 | | | 8.45 | 10.42 |
| IV-D | 2-(4-phenyl-1-piperazyl)-8-oxobicyclo[3.2.1]octane hydrochloride. | C₁₈H₂₄N₂O·HCl | 196–197 | | | | 8.72 | 11.05 | | | 8.92 | 11.01 |
| V-A | 1-(4-phenyl-1-piperazyl)cycloheptene. | C₁₇H₂₄N₂ | 59–61 | | | | 10.92 | | | | 11.09 | |
| V-B | 2-(4-phenyl-1-piperazyl)-10-oxobicyclo[3.4.1]decane. | C₂₀H₂₈N₂O | 133–135 | | | | 8.97 | | | | 9.21 | |
| V-C | 2-(4-phenyl-1-piperazyl)-10-oxobicyclo[3.4.1]decane hydrobromide. | C₂₀H₂₈N₂O·HBr | 226–227 | | | | | 20.32 (Br) | | | | 20.48 (Br) |

TABLE I—Continued

| Example No. | Chemical Name and Structure | Formula | Melting Point, °C. | Boiling Point, °C. (press.) | Analysis | | | | | | | | |
|---|---|---|---|---|---|---|---|---|---|---|---|---|---|
| | | | | | Calculated | | | | Found | | | | |
| | | | | | C | H | N | Cl | C | H | N | Cl |
| VI-A | 2-(4-phenyl-1-piperazyl)-4-phenyl-9-oxobicyclo [3.3.1] nonane. | C₂₅H₃₀N₂O | 167–168 | | | | 3.74 (basic) | | | | 3.72 (basic) | |
| VI-B | 2-(4-phenyl-1-piperazyl)-4-phenyl-9-oxobicyclo [3.3.1] nonane hydrochloride. | C₂₅H₃₀N₂O·HCl | 229–230 | | | | | 8.65 | | | | 8.48 |
| VII-A | 1-(4-m-chlorophenyl-1-piperazyl)-cyclohexene. | C₁₆H₂₁ClN₂ | | 160–170 (0.15 mm.) | | | 5.06 (basic) | | | | 5.01 (basic) | |
| VII-B | 8a-(4-m-chlorophenyl-1-piperazyl)-4a,5,6,7,8,8a-hexahydro-4H-1-benzopyran. | C₁₉H₂₅ClN₂O | 94.5–96 | | | | 4.21 (basic) | | | | 4.26 (basic) | |

TABLE I—Continued

| Example No. | Chemical Name and Structure | Formula | Melting Point, °C. | Boiling Point, °C. (press.) | Analysis ||||||||
|---|---|---|---|---|---|---|---|---|---|---|---|---|
| | | | | | Calculated |||| Found ||||
| | | | | | C | H | N | Cl | C | H | N | Cl |
| VII-C | 2-(4-m-chlorophenyl-1-piperazyl)-9-oxobicyclo[3.3.1]nonane. | C₁₉H₂₅ClN₂O | 94–96 | | | | 4.21 (basic) | | | | 4.27 (basic) | |
| VII-D | 2-(4-m-chlorophenyl-1-piperazyl)-9-oxobicyclo[3.3.1]nonane hydrochloride. | C₁₉H₂₅ClN₂O·HCl | 195–196 | | | | 7.57 | 9.59 | | | 7.48 | 9.53 |
| VIII-A | 2,4-diphenyl-8a-(4-phenyl-1-piperazyl)-4a,5,6,7,8,8a-hexahydro-4H-1-benzopyran. | C₃₅H₃₆N₂O | 129.5–130.5 | | 82.66 | 7.56 | 6.22 | | 82.47 | 7.34 | 6.23 | |
| VIII-B | 1-(4-phenyl-1-piperazyl)-2(6)-(1-phenyl-2-benzoylethyl)-cyclohexene. | C₃₁H₃₄N₂O | 134–135 | | 82.66 | 7.56 | 6.22 | | 82.10 | 7.42 | 6.25 | |

TABLE I—Continued

| Example No. | Chemical Name and Structure | Formula | Melting Point, °C. | Boiling Point, °C. (press.) | Analysis ||||||||
|---|---|---|---|---|---|---|---|---|---|---|---|---|
| | | | | | Calculated |||| Found ||||
| | | | | | C | H | N | Cl | C | H | N | Cl |
| IX | 2-phenyl-8a-(4-phenyl-1-piperazyl)-4a,5,6,7,8,8a-hexahydro-4H-1-benzopyran. | $C_{25}H_{30}N_2O$ | 96–97 | | | | 7.49 | | | | 7.40 | |
| X-A | 1-(m-trifluoromethylphenyl)-4-(1-cyclohexenyl)piperazine. | $C_{17}H_{21}F_3N_2$ | 154–169 (0.15 mm.) | | | | 4.51 (basic) | | | | 4.53 (basic) | |
| X-B | 2-(4-m-trifluoromethylphenyl-1-piperazyl)-9-oxobicyclo-[3.3.1]-nonane. | $C_{20}H_{25}F_3N_2$ | | | | | 3.82 (basic) | | | | 3.84 (basic) | |
| X-C | 2-(4-m-trifluoromethylphenyl-1-piperazyl)-9-oxobicyclo-[3.3.1] nonane hydrochloride. | $C_{20}H_{25}F_3N_2 \cdot HCl$ | 209–210 | | | | 6.96 | 8.80 | | | 7.00 | 8.75 |

In summary this invention relates to a series of novel piperazyl substituted bicycloalkanones which have useful pharmacological activity to intermediate aminopyran derivatives prepared in the synthesis thereof and to open-chain ketones prepared from such aminopyran derivatives.

What is claimed is:

1. A compound selected from the group consisting of compounds of the formula

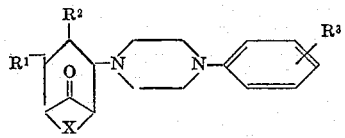

wherein $R^1$ is a member selected from the group consisting of hydrogen and phenyl, $R^2$ is a member selected from the group consisting of hydrogen and methyl, $R^3$ is a member selected from the group consisting of hydrogen, halogen and trifluoromethyl and X is a member selected from the group consisting of lower alkylene and cyclohexyl lower alkylene
and salts of said compounds with pharmacologically acceptable anions.

2. 2 - (4 - phenyl - 1-piperazyl)-9-oxobicyclo[3.3.1] nonane.

3. 2 - (4 - phenyl-1-piperazyl)-3-methyl-9-oxobicyclo [3.3.1]nonane.

4. 2 - (4 - phenyl - 1-piperazyl)-7-cyclohexyl-9-oxobicyclo[3.3.1]nonane.

5. 2 - (4 - phenyl - 1-piperazyl)-8-oxobicyclo[3.2.1] octane.

6. 2 - (4 - phenyl-1-piperazyl)-10-oxobicyclo[3.4.1]decane.

7. 2 - (4 - phenyl-1-piperazyl)-3-phenyl-9-oxobicyclo [3.3.1]nonane.

8. 2 - (4 - m - chlorophenyl-1-piperazyl)-9-oxobicyclo [3.3.1]nonane.

9. 2 - (4 - m - trifluoromethylphenyl-1-piperazyl)-9-oxobicyclo[3.3.1]nonane.

10. A process for the preparation of a compound of the formula

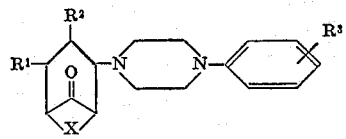

wherein $R^1$ is hydrogen, $R^2$ is a member selected from the group consisting of hydrogen and methyl, $R^3$ is a member selected from the group consisting of hydrogen, halogen and trifluoromethyl and X is a member selected from the group consisting of $$—(CH_2)_3— \text{ and } —CH_2—CH—CH_2—$$

which comprises
heating a compound of the formula

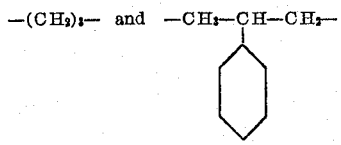

wherein $R^1$, $R^2$, $R^3$ and X are as above defined, with triethylamine and dimethylformamide to produce a compound of the formula

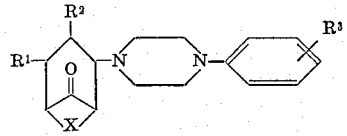

wherein $R^1$, $R^2$, $R^3$ and X are as above defined.

11. A process for the preparation of a compound of the formula

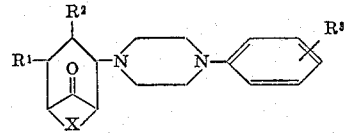

wherein $R^1$ is the group consisting of hydrogen, $R^2$ is a member selected from the group consisting of hydrogen and methyl, $R^3$ is a member selected from the group consisting of hydrogen, halogen and trifluoromethyl and X is a member selected from the group consisting of $$—(CH_2)_3— \text{ and } —CH_2—CH—CH_2—$$

which comprises
reacting a compound of the formula

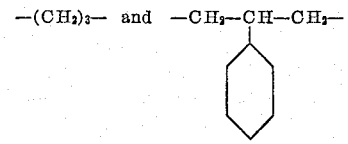

wherein $R^3$ and X are as above defined, with a compound of the formula

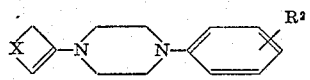

wherein $R^1$ and $R^2$ are as above defined in a nonpolar solvent at room temperature, to produce an isolatable crystalline intermediate of the formula

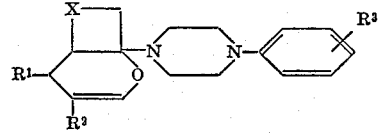

wherein $R^1$, $R^2$, $R^3$ and X are as above defined,
and heating said intermediate with triethylamine and dimethylformamide to produce a compound of the formula

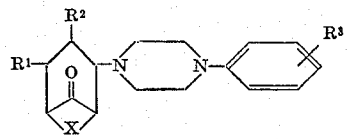

wherein $R^1$, $R^2$, $R^3$ and X are as above defined.

References Cited by the Examiner

UNITED STATES PATENTS 3,108,998  10/1963  Poos _____ 260—268

OTHER REFERENCES

Lebel et al.: Tetrahedron, vol. 20, pp. 215–229, February 1964.

Stork et al.: Journ. Amer. Chem. Soc., vol. 78, pp. 5129–30, 1956.

ALEX MAZEL, *Primary Examiner.*

HENRY R. JILES, *Examiner.*

J. W. ADAMS, JR., *Assistant Examiner.*

UNITED STATES PATENT OFFICE
CERTIFICATE OF CORRECTION

Patent No. 3,309,370                                  March 14, 1967

Robert Norman Schut

It is hereby certified that error appears in the above numbered patent requiring correction and that the said Letters Patent should read as corrected below.

Column 2, line 18, for "$+_3$N-DMF" read -- $Et_3$N-DMF --;

column 3, line 13, for "benzene ether" read -- benzene-ether --; column 4, line 55, for "-4H" read -- -4H- --; lines 72 and 73, for $\nu_{max}^{CHCl}$ 1660 (m.) cm.$^{-1}$     read     $\nu_{max}^{CHCl_3}$ 1660 (m.) cm.$^{-1}$ column 5, line 66, for "give" read -- gave --; column 7, line 9, for "170" read -- 170° --; line 12, after "7," insert -- 8, --; line 30, for "heater" read -- heated --; line 51, for "CH1" read -- HCl --; columns 9 and 10, TABLE I, Example I-B, for that portion of the structure reading

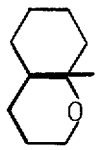        read        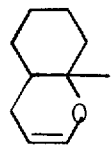

columns 11 and 12, Example III-B, for "78-95" read -- 78.95 --; columns 15 and 16, Example V-B, for that portion of the structure reading

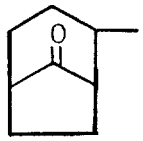        read        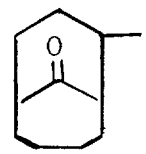

same Example V-B, for "$C_{20}H_2N_2O$" read -- $C_{20}H_{28}N_2O$ --; columns 17 and 18, Example VI-B, for that portion of the structure reading

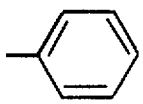        read        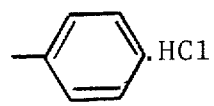

Example VII-B, for "$C_{59}H_{25}ClN_2O$" read -- $C_{19}H_{25}ClN_2O$ --;

columns 19 and 20, Example VII-C, for "$C_{59}H_{25}ClN_2O$" read -- $C_{19}H_{25}ClN_2O$ --; Example VII-D, for "$C_{59}H_{25}ClN_2O \cdot HCl$" read -- $C_{19}H_{25}ClN_2O \cdot HCl$ --; Example VIII-A, for "$C_{35}H_{34}N_2O$" read -- $C_{31}H_{34}N_2O$ --; column 23, line 3, after "activity" insert a comma; same column 23, lines 66 to 71, for that portion of the structure reading

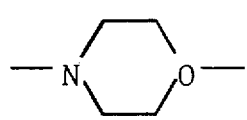   read   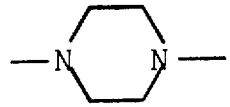

column 24, line 18, strike out "the group consisting of".

Signed and sealed this 25th day of June 1968.

(SEAL)
Attest:

EDWARD M. FLETCHER, JR.
Attesting Officer

EDWARD J. BRENNER
Commissioner of Patents